United States Patent
Caputo et al.

(10) Patent No.: US 11,745,158 B2
(45) Date of Patent: Sep. 5, 2023

(54) METHOD FOR MONITORING AND CONTROLLING A POLYMERIZATION PROCESS

(71) Applicant: BASELL POLIOLEFINE ITALIA S.R.L., Milan (IT)

(72) Inventors: Tiziana Caputo, Ferrara (IT); Antonio Mazzucco, Ferrara (IT); Nicolo Arich De Finetti, Ferrara (IT); Marco Bocchino, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 17/424,382

(22) PCT Filed: Jan. 21, 2020

(86) PCT No.: PCT/EP2020/051331
§ 371 (c)(1),
(2) Date: Jul. 20, 2021

(87) PCT Pub. No.: WO2020/152121
PCT Pub. Date: Jul. 30, 2020

(65) Prior Publication Data
US 2022/0072499 A1  Mar. 10, 2022

(30) Foreign Application Priority Data
Jan. 22, 2019  (EP) .................................... 19153106

(51) Int. Cl.
*B01J 19/00* (2006.01)
*C08F 2/01* (2006.01)
*B01J 19/24* (2006.01)

(52) U.S. Cl.
CPC ....... *B01J 19/0033* (2013.01); *B01J 19/2435* (2013.01); *C08F 2/01* (2013.01);
(Continued)

(58) Field of Classification Search
CPC ................ B01J 19/0033; B01J 19/2435; B01J 2219/002; B01J 2219/00213;
(Continued)

(56) References Cited

U.S. PATENT DOCUMENTS

| | | |
|---|---|---|
| 4,965,601 A | 10/1990 | Canty |
| 6,001,938 A | 12/1999 | Chinh et al. |

(Continued)

FOREIGN PATENT DOCUMENTS

| | | | |
|---|---|---|---|
| CN | 101018816 A | | 8/2007 |
| CN | 102455218 | * | 5/2012 |
| JP | 2010017641 A | | 1/2010 |

OTHER PUBLICATIONS

Machine Translation of CN 102455218 (Year: 2012).*
(Continued)

*Primary Examiner* — Lessanework Seifu (57) ABSTRACT

A method for monitoring and controlling the polymerization in a polymerization vessel by using a camera viewing unit to (a) detect features of the polymer particles, or the particles' environment, (b) compare the features to pre-defined acceptable values of these features or the environment, and (c) if a variation from the pre-defined values is detected, act on process parameters to reduce or eliminate the variation.

11 Claims, 4 Drawing Sheets

(52) U.S. Cl.
CPC ............ *B01J 2208/00044* (2013.01); *B01J 2208/0061* (2013.01); *B01J 2208/00672* (2013.01)

(58) Field of Classification Search
CPC .... B01J 2219/00222; B01J 2219/00229; B01J 2219/00234; B01J 2219/00218; B01J 2208/00672; B01J 2208/00681; B01J 2208/0069; B01J 2208/0699; C08F 2/01
See application file for complete search history.

(56) References Cited

U.S. PATENT DOCUMENTS

| | | | |
|---|---|---|---|
| 6,461,573 B1 | 10/2002 | Yamamoto et al. | |
| 2009/0156758 A1* | 6/2009 | Pater T.M. ............. | B01J 8/1827 526/64 |

OTHER PUBLICATIONS

International Search Report and Written Opinion dated May 12, 2020 (dated May 12, 2020) for Corresponding PCT/EP2020/051331.
Jochen T.M. Pater, Gunter Weickert and Wim P.M. Van Swaaij: "Optical and Infrared Imaging of Growing Polyolefin Particles", Aiche Journal, vol. 49, No. 2, Feb. 1, 2003 (Feb. 1, 2003), pp. 450-464, XP009515120.

* cited by examiner

METHOD FOR MONITORING AND CONTROLLING A POLYMERIZATION PROCESS

This application is the U.S. National Phase of PCT International Application PCT/EP2020/051331, filed Jan. 21, 2020, claiming benefit of priority to European Patent Application No. 19153106.0, filed Jan. 22, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a method for monitoring and controlling a polymerization process.

BACKGROUND OF THE INVENTION

In some instances, the polymerization of olefins is carried out in polymerization plants including several units. In some instances, the units include reactors and other types of vessels. In some instances, the olefins are selected from the group consisting of ethylene, propylene, butene, and higher olefins. Knowledge and understanding of the phenomena occurring in the reactors and/or other polymerization vessels facilitate control of the polymerization process. In some instances, wrong or inaccurate information lead to misinterpreation of such phenomena, resulting in mistakes in process control.

SUMMARY OF THE INVENTION

In a general embodiment, the present disclosure provides a method for monitoring and controlling the polymerization in a polymerization vessel containing polymer particles and including one or more camera viewing units capable of viewing the interior of the polymerization vessel, having the steps of:
  a) detecting one or more features of the polymer particles, or the particles' environment, by said the camera viewing units;
  b) comparing the one or more features to pre-defined values of the features to detect a variation from the pre-defined values; and
  c) if a variation from the pre-defined values of the features is detected, acting on one or more process parameters to reduce or eliminate the variation.

In some embodiments, the step of detecting one or more features of the polymer particles or the particles' environment, involves a feature selected from the group consisting of:
  i. morphology of the polymer particles;
  ii. opacity of the polymer particles;
  iii. temperature of the polymer particles;
  iv. velocity of the polymer particles;
  v. presence of liquid in the environment of the polymer particles;
  vi. fill level of the polymerization vessel containing the polymer particles; and
  vii. polymer concentration.

As used herein, the term "polymerization vessel" refers to a reactor, a tank, or equipment that contains polymer which is being formed, or is already formed as a result of a polymerization reaction, both in a static form or in a dynamic form. In some embodiments, the equipment is selected from the group consisting of steamers, dryers and devolatilization vessels. In some embodiments, the reactor includes reactor for gas-phase polymerization or a reactor for slurry polymerization.

As used herein, the term "polymer" refers to solid polymer particles, polymer dissolved in a liquid medium, or polymer melt.

As used herein, the term "environment of polymer particles" refers to the interior of the polymerization vessel, wherein the polymer particles are contained.

As used herein, the term "camera viewing unit" refers to a camera and any other optical instrument capable of capturing images, covering the visible or infrared range of the spectrum, or both.

DESCRIPTION OF THE FIGURES

The claimed subject matter may be understood by reference to the following description taken in conjunction with the accompanying figures, in which like reference numerals identify like elements, and in which:

DETAILED DESCRIPTION OF THE INVENTION

In some embodiments, the present disclosure provides a method for monitoring and controlling an olefin polymerization process by using one or more camera viewing units in contact with the interior of a polymerization vessel wherein the camera detects one or more features of the polymer particles or the particles' environment.

In some embodiments, the process uses a gas-phase polymerization reactor. In some embodiments, the gas-phase polymerization reactor compositions are made from or containing 0-50 wt % of polymer and 0-50 wt % of gas and liquid hydrocarbons, with 0-20 wt % of liquid hydrocarbons.

In some embodiments, the process uses a liquid-phase polymerization reactor. In some embodiments, the liquid-phase polymerization reactor compositions are made from or containing 20-70 wt % of polymer and 30-80 wt % of gas and liquid hydrocarbons, with 30-80 wt % of liquid hydrocarbons.

In some embodiments, the method is for the polymerization of one or more α-olefins carried out in a gas-phase polymerization reactor having two interconnected polymerization zones as described in European Patent Nos. EP 0782587 and EP 1012195.

In some embodiments, the growing polymer particles flow upward through a first polymerization zone under fast fluidization conditions, leave the first polymerization zone and enter a second polymerization zone through which the polymer particles flow in a densified form under the action of gravity. Then the particles leave the second polymerization zone and are reintroduced into the first polymerization zone, thereby establishing a circulation of polymer particles between the two polymerization zones.

Figure 1:
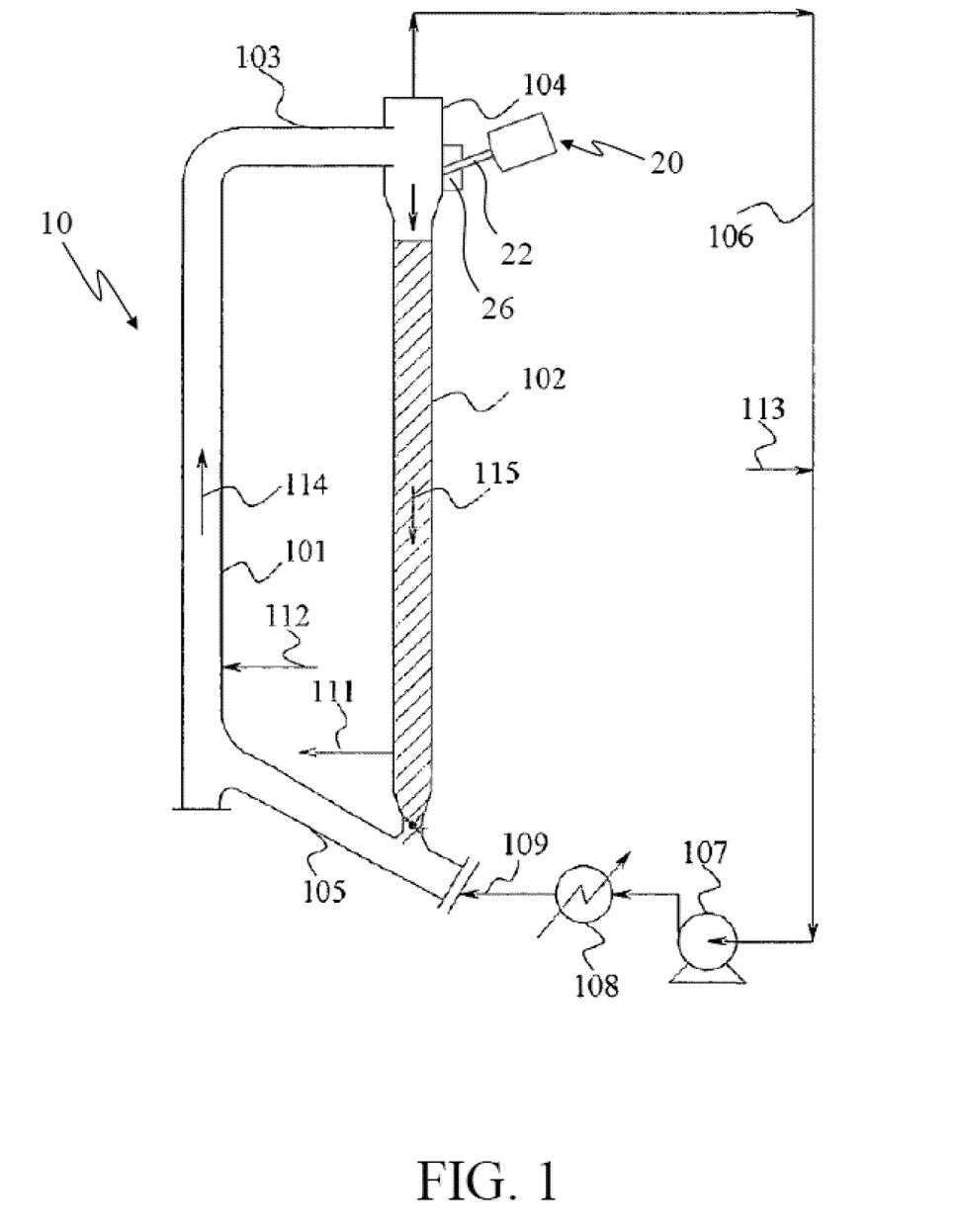
FIG. 1 is a schematic of a polymerization reactor having two interconnected polymerization zones.

FIG. 1 shows a polymerization reactor 10 having a first polymerization zone 101 and a second polymerization zone 102.

The growing polymer flows through the first polymerization zone 101 under fast fluidization conditions along the direction of the arrow 114. In the second polymerization zone 102, the growing polymer flows in a densified form under the action of gravity along the direction of the arrow 115. The two polymerization zones 101 and 102 are interconnected by sections 103 and 105.

The material balance is maintained by feeding in monomers and catalysts and discharging polymer that has been formed.

In some embodiments, the various catalyst components are fed to the first polymerization zone 101 through a line 112. In some embodiments, the line 112 is placed in the lower part of the first polymerization zone 101. In some embodiments, the polymer is discharged through a line 111, where the polymer particles flow in a more packed form, thereby minimizing the quantity of entrained gas. In some embodiments, line 111 is placed in the second polymerization zone 102.

The polymer and the gaseous mixture leaving the first polymerization zone 101 are conveyed to a solid/gas separation zone 104. In some embodiments, the solid/gas separation is effected by a separator of the inertial type or of the centrifugal type, or a combination of the two.

From the separation zone 104, the polymer enters the second polymerization zone 102. The gaseous mixture leaving the separation zone 104 is compressed, cooled and transferred to the first polymerization zone 101 through the line 109. In some embodiments, make-up monomers, molecular weight regulators, or inert gases are added to the gaseous mixture to the first polymerization zone 101 through the line 109. The transfer of the gaseous mixture is effected by a recycle line 106, equipped with a compressor 107 and a cooler 108, and a line 113 for feeding monomers, molecular weight regulators and, optionally, inert gases.

A camera viewing unit 20, having a viewer 22, is mounted in the zone 104 of reactor 10, for carrying out the method.

The camera viewing unit 20 is mounted inclined with respect to the reactor wall. In some embodiments, the camera viewing unit 20 is mounted horizontally.

Figure 2:
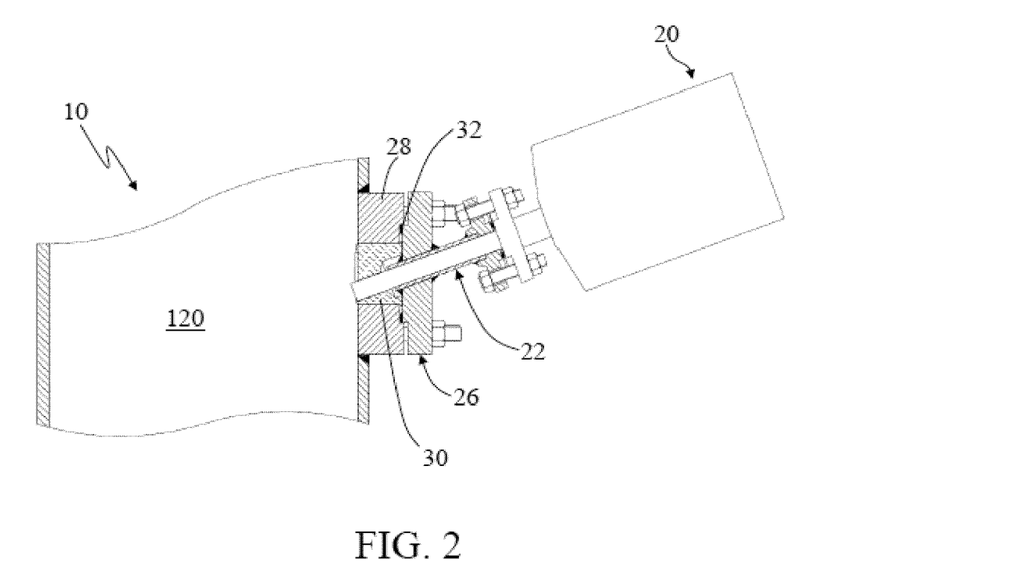
FIG. 2 is a sectional view of a part of a polymerization reactor, wherein a camera viewing unit has been mounted.
Figure 3:
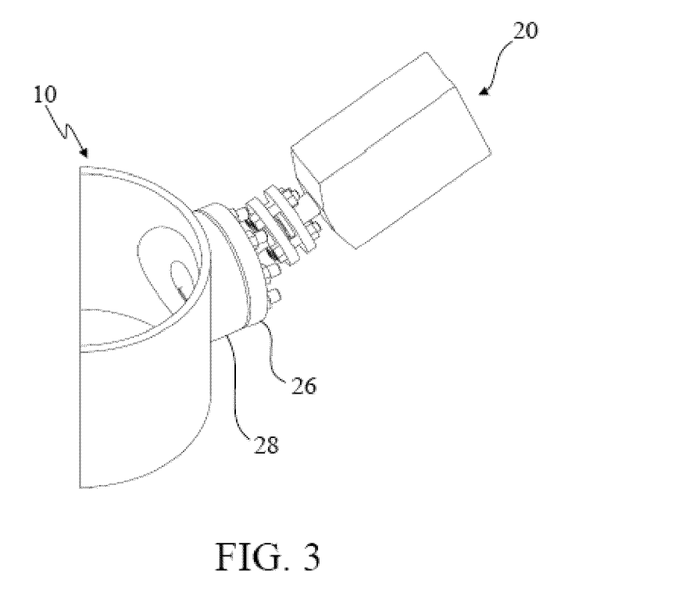
FIG. 3 is a perspective view of a part of the polymerization reactor with the camera viewing unit of FIG. 2.

In some embodiments and with reference also to FIGS. 2 and 3, the camera 20 is provided with a viewer 22, made from or containing a tubular projection containing a lens, or a system of lens, not shown, for viewing the internal environment 120 of reactor 10. In some embodiments, the viewer 22 is an image sensor or detector. In some embodiments, the viewer 22 is CCD or CMOS.

The camera viewing unit 20 with a viewer 22 is mounted on the wall of the reactor by a flange 26 bolted on a hollow projection 28 of the reactor.

The tip of the viewer 22, which is exposed to the internal part of the reactor, therefore to the polymerization environment, is made of a glass resistant to the polymerization conditions. In some embodiments, the tip is a sapphire window. The tip of the viewer 22 is sealed from the internal part of the reactor and from the polymerization environment. In some embodiments, the tip of the viewer 22 was at least double sealed by gaskets 30 and 32.

The tip of the camera, the flange 26 and gaskets 30 and 32 are made of a material for polymerization reactor design conditions. In some embodiments, the temperature ranges from 50 to 150° C. and the pressure ranges from 0-60 MPa.

In some embodiments, the polymerization reactor design conditions are for yielding PP or PE in combination with gaseous and liquid hydrocarbons.

In some embodiments, the camera viewing unit 20 and the viewer 22 comply with the ATEX directive of the European Union concerning the protection of employees from explosion risk in areas with an explosive atmosphere.

In some embodiments, the resolution of the camera ranges from 0.1 Mpixel to 3 Mpixel and from 25 to 1000 frame per seconds.

In some embodiments, illumination for the camera is provided from inside the tip of the camera or from external sources. In case of the external sources, the external sources are installed in the portion of the reactor, wherein the camera is installed. In some embodiments, illumination is provided by a cold light source. In some embodiments, LED is the cold light source. In case of a different illumination sources, the surface of the source is cooled to avoid hot spots inside the reactor.

In some embodiments, images and videos captured by the camera are watched in-line by a computer system. In some embodiments, images and videos captured by the camera are recorded in an external hard disk to be viewed off-line.

In some embodiments, the present disclosure provides a method for monitoring morphological features of the polymer particles inside a polymerization vessel by one or more camera viewing units having a viewer in direct contact with an interior of the polymerization vessel. In some embodiments, the polymerization vessel is a polymerization reactor.

In some embodiments, the monitored morphological feature is the size of the polymer particles. In some embodiments, the particle size of an olefin polymer particle depends on the type of process, the catalyst system, or the polymerization conditions. As used herein, the term "normally-grown" refers to polymer particles having a particle size of a pre-defined value.

As used herein, the term "polymer fines" refers to particles smaller than the pre-defined value. In some embodiments, polymer fines are avoided because polymer fines easily melt and form "hot spots" within the reactor.

Figure 4:
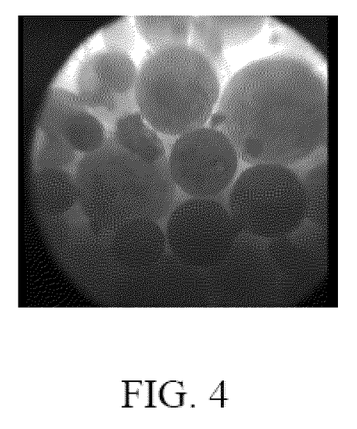
FIGS. 4, 5 and 6 are images of polymer particles detected in a polymerization reactor.

FIG. 4 is an image taken by a camera, showing the presence of polymer fines.

Figure 5:
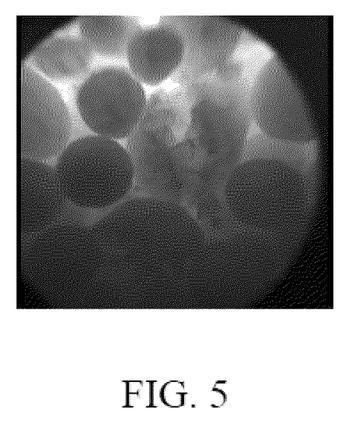

FIG. 5 is an image taken with a camera, showing the presence of polymer fines and the breakage of normally-grown polymer particles.

In some embodiments, large-particle-size polymer particles are avoided in a polymerization process because the size is due to swelling by excessive absorption of monomer, thereby causing reduced flowability. In some embodiments, the large size is caused by the formation of lumps, thereby rendering the polymerization process less stable.

In some embodiments, polymer particles, not having a particle size of a pre-defined value, are detected by a camera viewing unit having a viewer in contact with the interior of the polymerization reactor. In some embodiments, a variation from the pre-defined values of size of the polymer particles affects the polymerization process.

In some embodiments and as shown in FIGS. 4 and 5, the camera viewing unit is arranged horizontally with respect to the reactor wall.

In some embodiments, images detected by the camera and allow a visual observation of a relevant portion of the interior of the reactor in real time or in time delay. In some embodiments, images detected by the camera and allow a visual observation of a relevant portion of the interior of the reactor are recorded, stored in a data storage device, and viewed off-line.

In some embodiments, images of real polymer particles inside a reactor are then compared to reference images having pre-defined, acceptable size values. In some embodiments, the pre-defined, acceptable size values are expressed as a range of sizes. In some embodiments, particles of size<500 μm are regarded as too small and considered polymer fines. In some embodiments, particles of size>3000 μm are regarded as too large. In some embodiments, an acceptable size is defined as follows: 500 μm≤acceptable size≤3000 μm.

In some embodiments, the comparison of images is done by combining different images detected by the camera with image software analysis such as Image-Pro Plus of Media Cybernetics, Fiji ImageJ or others.

In some embodiments, the comparison of the images of real polymer particles inside a reactor with the pre-defined, reference images results in finding particles that are too small or too large. In some embodiments, one or more process parameters are modified to reduce or eliminate the size variation from the pre-defined acceptable values.

In some embodiments, polymer fines are detected and an antistatic agent is fed to the reactor, thereby avoiding the formation of hot-spots. In some embodiments, the amount of antistatic agent is increased. In some embodiments, other process parameters are modified.

Figure 6:
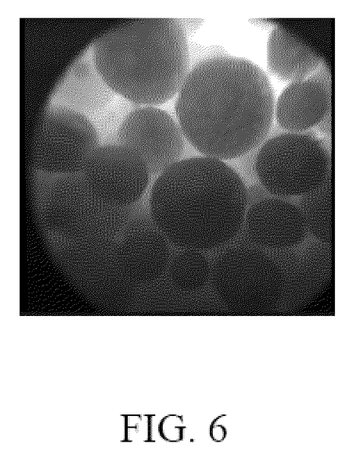

FIG. 6 is an image taken with a camera, showing that the presence of polymer fines has been eliminated by modifying process parameters.

In some embodiments, the swelling of particles is detected and process parameters are modified, thereby avoiding the formation of chunks. In some embodiments, the modification of process parameters is selected from the group consisting of increasing the process temperature and decreasing the process pressure.

In some embodiments, a monitored feature of a polymer particle is the opacity of the polymer particles. The degree of opacity describes the degree of transparency.

It is believed that the degree of opacity of an olefin polymer particle is an indication of the amount of instant Xylene Solubles ("XS"). In some embodiments, the XS value refers to the percentage of soluble species in homopolymers and copolymers of polypropylene. The XS value, in turn, correlates to the amorphous content of the polymer. In some embodiments, detection of anomalous opacity of particles due to XS content allows adjustment of the polymerization conditions before XS content is detected via in-line analysis. In some embodiments, anomalous opacity of particles is detected by visually comparing images of real polymer particles inside a reactor with reference images having pre-defined, acceptable opacity.

In some embodiments, a monitored feature of a polymer particle is the temperature of the polymer particles.

It is believed that, for gas phase polymerization reactors, monitoring and controlling the reactor thermal profile helps avoid hot spots. It is believed that, in some instances, temperature control of the process measures the temperature in the gas phase environment, not the real temperature of the polymer particles.

An infrared (IR) camera viewing unit, alone or associated to an optical camera viewing unit, is used to detect the temperature at the surface of the polymer particles, thereby detecting possible temperatures higher than pre-defined, acceptable temperatures. In some embodiments, a temperature higher than an acceptable is associated with the presence of polymer fines. It is believed that polymer fines have a reaction kinetic higher than particles having the pre-defined particle size. It is further believed that, in some instances, the higher reaction kinetics causes the formation of hot spots and chunks, thereby clogging pipes and the reactor.

In some embodiments, a ThermaCAM PM 290 of Inframetrics Inc. is used as the camera viewing unit and arranged horizontally with respect to the reactor wall. This camera observes the infrared emission from the polymerization vessel and determines the intensity of the radiation with a wavelength between 3.4 and 5.0 μm, with an update rate of 50 Hz. The IR camera used a 256×256 platinum silicide focal plane array detector. An integrated closed-cycle cryogenic cooler maintains the low detector temperature of 77K. The IR camera measures the surface temperature of the polymer particles. In some embodiments, the surface temperature is the maximum temperature in the particle.

In some embodiments, a method using an IR camera viewing unit allows early identification of particles having a high temperature. In some embodiments, the process conditions are modified, thereby avoiding formation of hot spots. In some embodiments, the reaction kinetics are slowed.

In some embodiments, a monitored feature of a polymer particle is the velocity of the polymer particles.

In some embodiments, the process involves a moving packed bed.

Measurement of the velocity with a camera viewing unit is obtained by processing the images of consecutive frames obtained with the camera and counting the number of frames per unit of time. In some embodiments, the unit of time is a second. For each consecutive frame, one or more target particles are identified, thereby determining the path of each particle between a starting point and an end point. In some embodiments, the target particles are identified by size. The length of the path divided by the time taken to move along that path gives the velocity of the particle. The average velocity of a representative number of polymer particles is a measure of the solid velocity of the moving packed bed.

In some embodiments, the method provides monitoring features of the environment around the polymer particles inside a polymerization vessel. In some embodiments, the polymerization vessel is a polymerization reactor. In some embodiments, the method allows detection of liquid droplets and control of the dew point in a gas-phase reactor. In some embodiments, the images of the environment are compared to reference images, thereby determining whether liquid droplets are present or whether liquid droplets are present in a pre-defined, acceptable amount. In some embodiments, the process conditions are varied to remove droplets of liquid and prevent formation thereof.

In some embodiments, droplets of liquid are formed when heavy comonomers are fed to reactor in a large amount. In some embodiments, temperature is not controlled. In some instances, liquids droplets cause a stop in the circulation of the polymer and shut down the plant.

Figure 7:
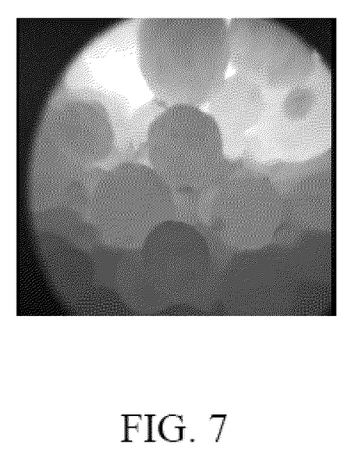
FIGS. 7, 8 and 9 are images of liquid droplets detected in a polymerization reactor.
Figure 8:
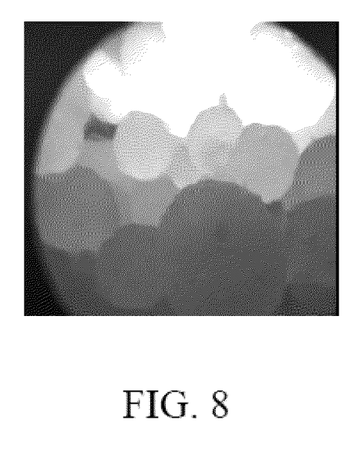

FIGS. 7 and 8 are image taken with a camera, showing the presence of liquid droplets in a gas-phase reactor.

Figure 9:
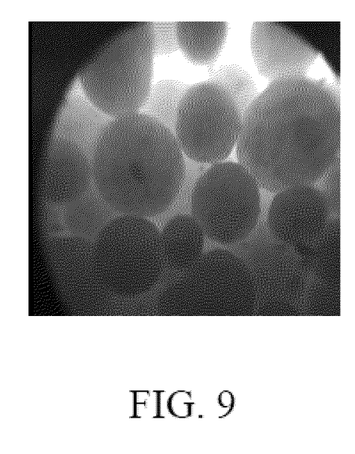

FIG. 9 is an image taken with a camera, showing that the presence of liquid droplets was eliminated by modifying process parameters. In some embodiments, the modification of process parameters is decreasing the concentration of heavy comonomers.

In some embodiments, the method provides monitoring features of the environment around the polymer particles inside a polymerization vessel. In some embodiments, the polymerization vessel is a polymerization reactor. In some embodiments, monitoring relates to the detection of the fill level of a polymerization reactor. In some embodiments, the images of the environment are compared to reference images, thereby determining whether the fill level different from the pre-defined, acceptable fill level shown in the reference images.

In some embodiments, the reactors are fluidized bed reactors and reactors having two interconnected polymerization zones wherein growing polymer particles flow upward through a first polymerization zone ("riser") under fast fluidization conditions and flow downwards through a second polymerization zone ("downcomer") in a densified form under the action of gravity. In some embodiments, the fill level of the reactors is controlled. In some embodiment, knowing the exact fill level permits maximum exploitation of the volume of the reactor, thereby increasing the productivity and the reliability of the process.

In some embodiments, a monitored feature is the concentration of polymer in polymerization environment. In some embodiments and per frame, a solid/fluid volume ratio is estimated from image analysis. Average value of several frame is related to volume/volume ratio. In some embodiments, a calculation, imposing a density derived from polymerization conditions, is used to estimate mass concentration.

In some embodiments, the fill level of the reactor is monitored and controlled by viewing the fill level in zones with camera viewing units mounted at points of the reactor. In some embodiments and by image analysis, images of zones fully covered by the polymer particles are distinguished from images of zones not covered or partially covered by the polymer particles. This image analysis generates information that is converted into a signal varying from 0 to 100% of coverage by polymer particles. The signal on percentage of coverage is, in turn, used by a level control system that actuates a polymer discharge valve when the level reaches a pre-defined threshold.

Figure 10:
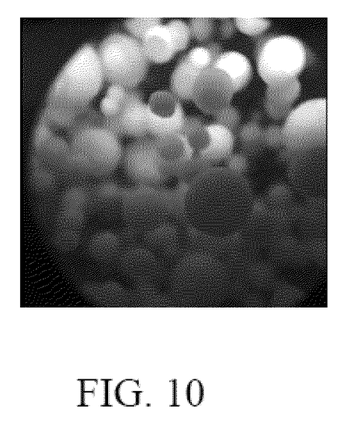
FIGS. 10 and 11 are images of the fill level of a polymerization reactor.
Figure 11:
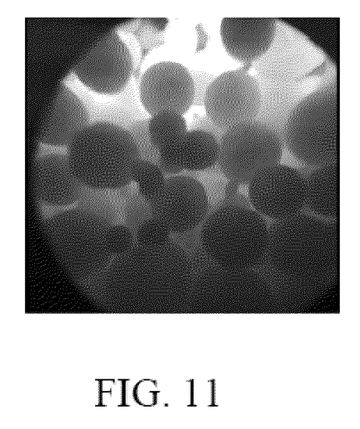

FIGS. 10 and 11 are images, showing the level of polymer in a packed-bed reactor, or reactor zone, wherein the pre-defined fill level is marked by a horizontal line. These images were taken by a camera viewing unit mounted at the height corresponding to the pre-defined fill level of the reactor.

FIG. 10 is an image with a coverage of 100%, showing that a pre-defined fill level was reached. FIG. 11 is an image, showing that the percentage of coverage is below 100% and the pre-defined fill level was not reached.

In some embodiments and depending on the feature to be detected and on the type of polymerization vessel, the camera viewing unit is mounted in many different positions.

In FIG. 1, the camera viewing unit is mounted above the pre-defined fill level of the reactor. In some embodiments, the camera viewing unit is mounted in an inclined or perpendicular nozzle with the lens pointing downwards. The images show the top of the polymer bed. In some embodiments, the fill level is calculated based upon the number of polymer particles per unit of area of the image corresponding to 100% fill level and by carrying out an image analysis, thereby determining the percentage of fill level. Because the distance of the top of the polymer bed from the camera decreases with the increase of the height of the polymer bed, the number of particles per unit of area of the image decreases. In some embodiments and from the number of particles per unit of area, the distance of the top of the bed from the camera is determine. In some embodiments, the distance is used to determine when the pre-defined fill level is reached.

In some embodiments and as illustrated in FIG. 1, the camera viewing unit is mounted corresponding to the pre-defined fill level of the reactor. In some embodiments, the camera viewing unit is mounted in a perpendicular nozzle.

In some embodiments, the feature to be detected is the polymer particles' morphology. In some embodiments and as illustrated in FIG. 1, the camera viewing unit is mounted in the middle of the polymerization zone 102.

In some embodiments, the feature to be detected is the polymer concentration. In some embodiments and as illustrated in FIG. 1, the camera viewing unit is mounted in the middle of the polymerization zone 101.

In some embodiments, the polymerization reactors are fluidized bed gas phase reactors or liquid phase loop reactors. In some embodiments, the polymerization vessel is selected from the group consisting of polymerization reactors, steamers, dryers, and devolatilizers, that contains polymer particles. In some embodiments and in gas phase reactors, steamer, dryers, and devolatilizers, the camera viewing unit is mounted inside the polymer bed in horizontal nozzle. In some embodiments and in gas phase reactors, steamer, dryers, and devolatilizers, the camera viewing unit is mounted above the polymer bed in an inclined nozzle pointing downwards.

What is claimed is:

1. A method for monitoring and controlling the polymerization in a polymerization reactor containing polymer particles and comprising one or more camera viewing units capable of viewing the interior of the polymerization reactor, comprising the steps of:
   a. detecting a fill level of the polymerization reactor containing the polymer particles by capturing one or more images of the environment of the polymer particles by the one or more camera viewing units;
   b. comparing the images of the environment to reference images of the environment showing a pre-defined, acceptable fill level of the polymerization reactor; and
   c. if the comparison of the images of the environment of the polymer particles with the reference images results in finding a fill level different from the pre-defined, acceptable fill level shown in the reference images, one or more process parameters are modified to eliminate or reduce the difference of fill levels.

2. The method according to claim 1, further comprising the step of detecting one or more features relating to the polymer particles or the particles' environment by the one or more camera viewing units, wherein the step of detecting one or more features relating to the polymer particles or the particles' environment, involves a feature selected from the group consisting of:
   i. morphology of the polymer particles;
   ii. opacity of the polymer particles;
   iii. temperature of the polymer particles;
   iv. velocity of the polymer particles;
   v. presence of liquid in the environment of the polymer particles; and
   vi. polymer concentration.

3. The method according to claim 2, wherein:
   a. detecting a feature relating to the morphology of the polymer particles comprises capturing, by the one or more camera viewing units, one or more images of the particles and detecting the size of the polymer particles from the images;
   b. comparing the images of the polymer particles to reference images having pre-defined, acceptable size values; and
   c. if the comparison of the images of the polymer particles with the reference images results in finding particles that have a size different from that of the reference images, one or more process parameters are modified to reduce or eliminate the size variation from the pre-defined acceptable size values.

4. The method according to claim 3, wherein the pre-defined, acceptable size values of the polymer particles vary from 500 μm to 3000 μm.

5. The method according to claim 2, wherein:
a. detecting a feature relating to the opacity of the polymer particles, comprises capturing, by the one or more camera viewing units, one or more images of the particles and detecting the opacity of the polymer particles from the images;
b. comparing the images of the polymer particles to reference images having pre-defined, acceptable opacity; and
c. if the comparison of the images of the polymer particles with the reference images results in finding particles that have an opacity different from that of the reference images, one or more process parameters are modified to reduce or eliminate the variation from the pre-defined acceptable opacity.

6. The method according to claim 2, wherein:
a. detecting the temperature of the polymer particles by a camera viewing unit, selected from the one or more camera units, that covers the infrared range of the spectrum;
b. comparing the temperature of the polymer particles to a reference temperature of a pre-defined, acceptable value; and
c. if the comparison of the temperature of the polymer particles with the reference temperature results in finding particles that have a temperature different from that of the reference temperature, one or more process parameters are modified to reduce or eliminate the temperature variation from the pre-defined acceptable temperature.

7. The method according to claim 6, wherein the detected temperature of the polymer particles is the surface temperature of the polymer particles.

8. The method according to claim 2, wherein:
a. detecting a velocity of the polymer particles by processing the images of consecutive frames obtained with the one or more camera viewing units and counting the number of frames per unit of time, identifying one or more target particles for each consecutive frame, determining the path of each particle between a starting point and an end point, and dividing the length of the path by the time taken by the polymer particle to move along the path, thereby obtaining the velocity of the polymer particle;
b. comparing the velocity of the polymer particles to a reference velocity of a pre-defined, acceptable value; and
c. if the comparison of the velocity of the polymer particles with the reference velocity results in finding particles that have a velocity different from the reference velocity, one or more process parameters are modified to reduce or eliminate the velocity variation from the pre-defined acceptable velocity.

9. The method according to claim 2, wherein:
a. detecting the presence of liquid droplets in the environment of the polymer particles by capturing one or more images of the environment of the polymer particles by the one or more camera viewing units;
b. comparing the images of the environment to reference images of the environment showing no presence of liquid droplets, or showing a pre-defined, acceptable amount of liquid droplets; and
c. if the comparison of the images of the environment of the polymer particles with the reference images results in finding the presence of liquid droplets in an amount higher than that of the reference images, one or more process parameters are modified to eliminate the presence of the liquid droplets or reduce the amount of liquid droplets to the pre-defined acceptable amount of liquid droplets.

10. The method according to claim 1, wherein the method is carried out by analyzing the images captured in step a., converting the images into a signal varying from 0 to 100% of coverage by polymer particles, and processing the signal on percentage of coverage by a level control system, thereby actuating a polymer discharge valve when the fill level reaches a pre-defined threshold.

11. The method according to claim 2, wherein:
a. detecting the polymer concentration in the polymerization reactor containing the polymer particles by capturing one or more images of the environment of the polymer particles by the camera viewing units;
b. comparing the images of the environment to reference images of the environment showing a pre-defined, acceptable polymer concentration in the polymerization reactor or calculating a concentration from the images of the environment, based on the distance of the top of the polymer bed from the camera; and if the comparison of the images of the environment of the polymer particles with the reference images or the calculated concentration results in finding a polymer concentration different from the pre-defined, acceptable polymer concentration shown in the reference images or reference pre-defined fill level, one or more process parameters are modified to eliminate or reduce the difference of polymer concentration.

* * * * *